United States Patent [19]

Mardinian et al.

[11] Patent Number: 5,670,941
[45] Date of Patent: Sep. 23, 1997

[54] TERMINAL FOR CONTACTLESS COMMUNICATION WITH PORTABLE OBJECTS

[75] Inventors: Grégory Mardinian, Montmorency; Frédéric Wehowski, Gretz Armainvilliers, both of France

[73] Assignee: Innovatron Industries, Société Anonyme, Paris, France

[21] Appl. No.: 562,126

[22] Filed: Nov. 22, 1995

[30] Foreign Application Priority Data

Nov. 22, 1994 [FR] France .................... 94 13954

[51] Int. Cl.⁶ .................................... G08B 13/24
[52] U.S. Cl. .................. 340/551; 235/382; 235/440; 340/825.31
[58] Field of Search .................. 340/551, 572, 340/825.31, 825.32, 825.34, 825.54, 825.49, 505; 235/380, 382, 382.5, 440, 449, 450; 342/42, 44

[56] References Cited

U.S. PATENT DOCUMENTS

| | | | |
|---|---|---|---|
| 3,758,849 | 9/1973 | Susman et al. | 340/551 X |
| 4,459,474 | 7/1984 | Walton | 235/380 |
| 4,857,913 | 8/1989 | Lewiner et al. | 340/825.31 |
| 4,870,391 | 9/1989 | Cooper | 340/551 X |

FOREIGN PATENT DOCUMENTS

| | | |
|---|---|---|
| 0 412 884 | 2/1991 | European Pat. Off. . |
| 19781 | 9/1994 | WIPO . |

*Primary Examiner*—Thomas Mullen
*Attorney, Agent, or Firm*—Bardehle, Pagenberg, Dost, Altenburg, Frohwitter, Geissler & Partners

[57] ABSTRACT

A terminal for contactless communication with portable objects comprises a wave pickup device responsive to the magnetic component of an electromagnetic field, and a receiver which cooperates with the wave pickup device to receive and amplify signals picked up thereby. The wave pickup device comprises at least two distinct and adjacently disposed wave pickup elements spaced apart by a predetermined gap, and a discriminator for deriving a discrimination signal from the signals picked up by each of the wave pickup elements during a given period. The discrimination signal indicates which one of the wave pickup elements has received a signal of greater amplitude.

4 Claims, 2 Drawing Sheets

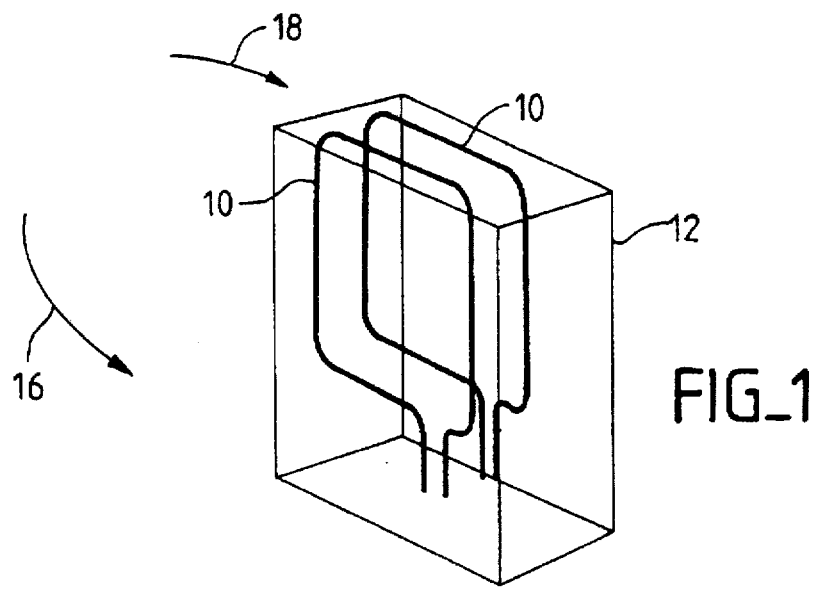
FIG_1
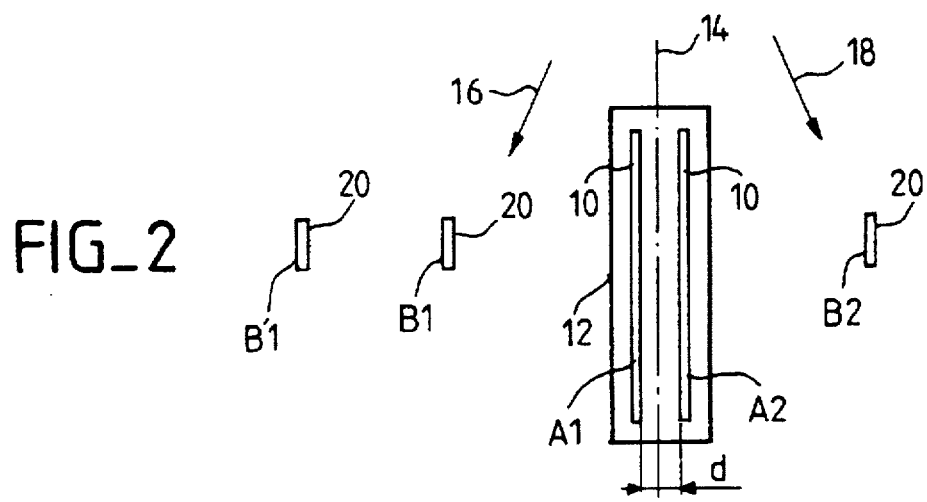
FIG_2
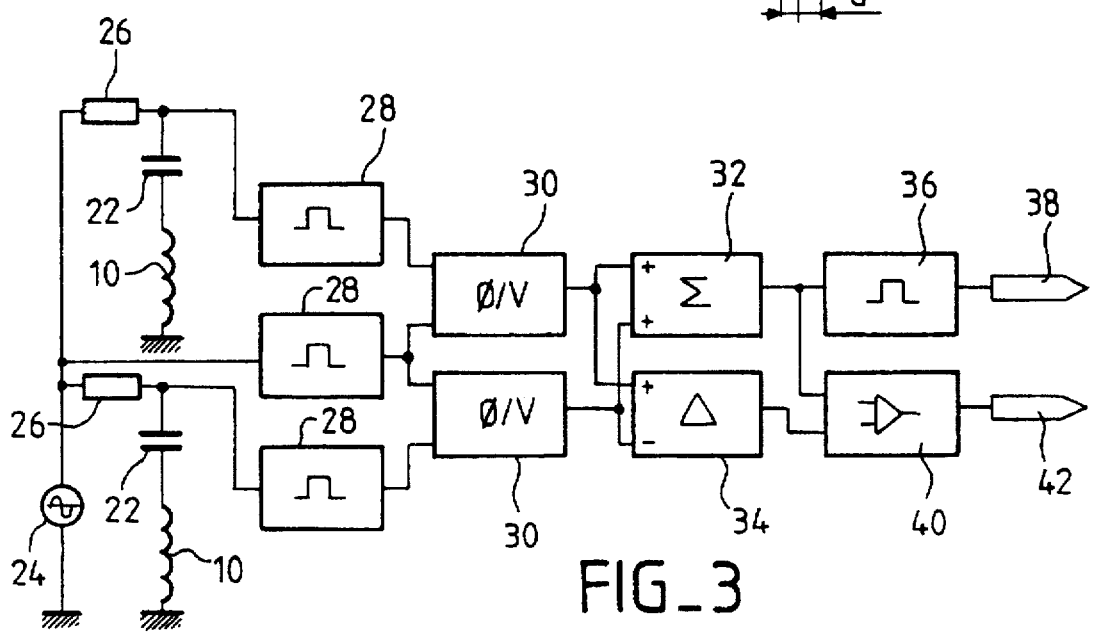
FIG_3

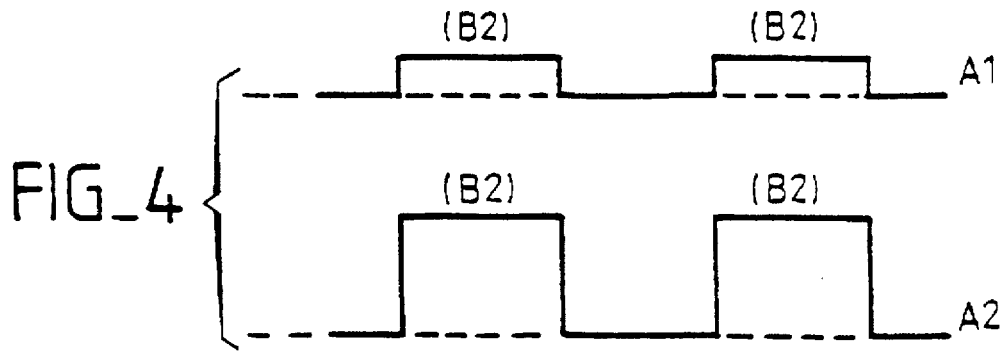
FIG_4
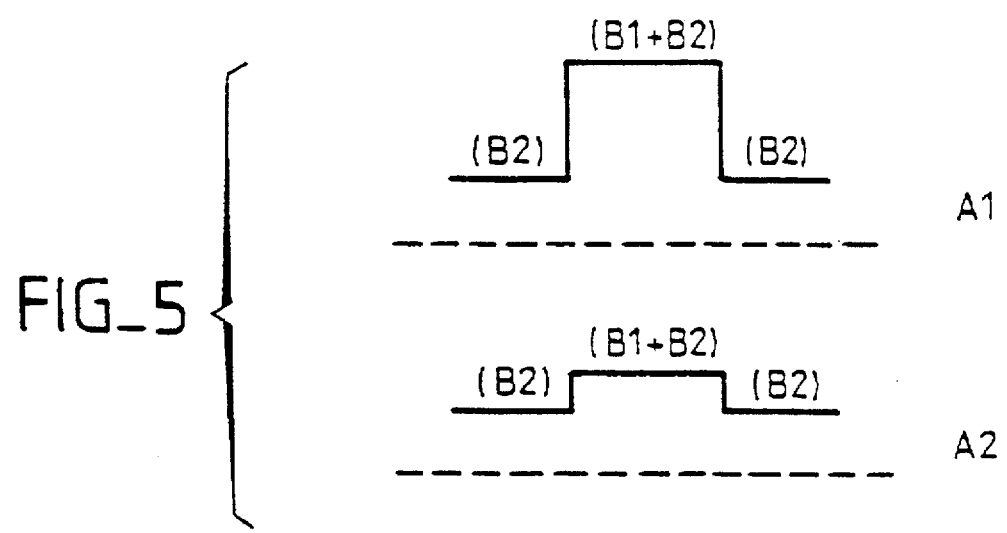
FIG_5
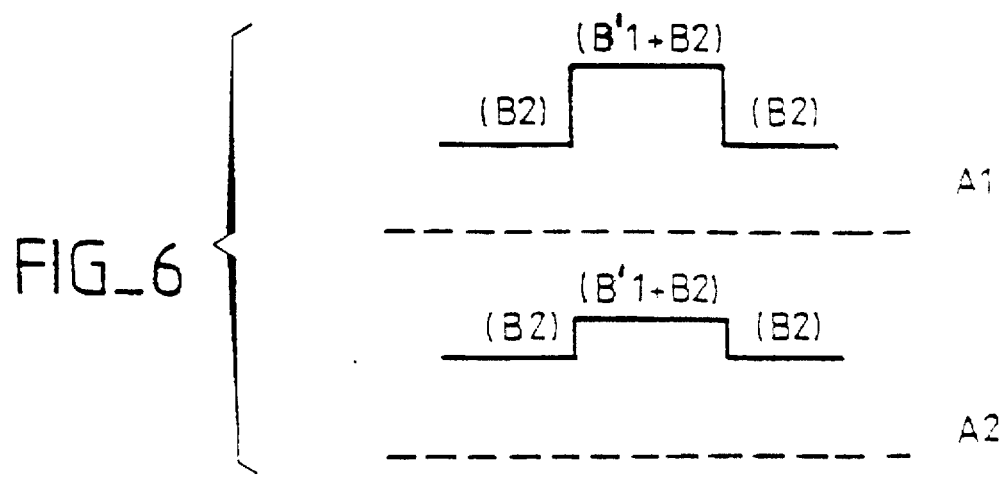
FIG_6

5,670,941

TERMINAL FOR CONTACTLESS COMMUNICATION WITH PORTABLE OBJECTS

The invention relates to contactless communication between a terminal and a portable object.

BACKGROUND OF THE INVENTION

Such systems for contactless data interchange are well known, and are described, for example, in EP-A-0 565 469, in the name of the Applicant, to which reference may be made for further details, in particular concerning control of data interchange between the portable object (referred to below merely as a "badge") and the terminal, and the various communications protocols used.

Of the various applications for that technique, mention may be made in non-limiting manner of access control and of remote payment, e.g. for gaining access to and paying for public transport.

In a public transport system, each user may be provided with a portable object of the "contactless card" or "contactless badge" type, which object is suitable for interchanging data (by reading and possibly also writing in a data memory included in the object) via the terminal by moving the badge close to the terminal so as to enable electromagnetic coupling to take place without direct electrical contact.

The invention relates to the particular case where, once such coupling has been established, data is interchanged by varying a magnetic field produced by an induction coil. In that technology of data interchange by inductive means, because data transfer is performed by a magnetic field, the zone in which data transfer can take place is very well localized. This characteristic and the very low cost of the communications function, constitute the main advantages of this technique that make it preferable to radio coupling which is much more expensive and more prone to variations in range.

In some cases, it may be desirable to provide an access control or remote payment system in which badges can be detected equally well on either side of the coil of the terminal. This occurs, for example, when the coil is disposed vertically, being mounted on a post which users can pass on either side.

In such a configuration, the terminal cannot tell whether the badge holder is on one side or the other of the loop, and this can give rise to ergonomic problems since it is then necessary to prevent two users presenting their badges simultaneously or quasi-simultaneously, one on the left and the other on the right. Under such circumstances, recognition of one of the users (the user with whom the data interchange protocol begins first) can give rise to an authorization signal, e.g. the lighting of a lamp, which runs the risk of being understood by the other user as applying to him, whereas his own badge is too far from the loop to be able to communicate with the terminal.

A first technical solution for providing a terminal capable of determining the side on which a user has initiated communication consists in placing two antennas side by side and separating them by a metal plate so that the respective radiation patterns of the two loops are separated into two distinct half-patterns. However, in the particular case to which the present invention applies, where information is interchanged by varying a magnetic field, the presence of a magnetic plate has the effect of considerably disturbing the field pattern and of greatly reducing the range of the loop—unlike data interchange by radio where the presence of a metal plate would act as a reflector serving only to alter the directivity of the antenna.

OBJECTS AND SUMMARY OF THE INVENTION

Since that technique is not satisfactory, the invention proposes another technique which has the advantage of discriminating the side of the badge with which communication has been established but without losing range compared with a loop in a traditional system.

To this end, the invention provides a terminal of known type comprising: wave pickup means responsive to the magnetic component of an electromagnetic field; receiver means co-operating with the wave pickup means to receive and amplify the signals picked up thereby; and checking means controlled by the data coming from a portable object; the terminal further comprising: at least two distinct wave pickups disposed adjacent to each other and separated from each other by a predetermined gap; and discriminator means for deriving a discrimination signal from the signals picked up by each of the wave pickups during the same given period, the discrimination signal indicating which one of the wave pickups has received the signal having the greater amplitude, said discrimination signal being transmitted to the checking means together with a signal representative of the data picked up by the wave pickup means.

In an advantageous embodiment, the discriminator means comprise: summing means for producing a signal representative of the sum of the amplitudes of said respective signals picked up by each of the wave pickups during a given period; and subtracter means for producing a signal representative of the difference between the amplitudes of the same signals as respectively picked up during the same period, the discriminator means deriving said discrimination signal indicating which one of the wave pickups has received the signal presenting the greater amplitude on the basis of the signals produced simultaneously by the summing means and the subtracter means.

BRIEF DESCRIPTION OF THE DRAWINGS

Other characteristics and advantages of the invention appear on reading the following detailed description given with reference to the accompanying drawings.

FIG. 1 is a diagrammatic perspective view showing the shape of the double loop of the invention.

FIG. 2 is a plan view of the FIG. 1 double loop, explaining the various possible positions of badges present simultaneously in the vicinity of said double loop.

FIG. 3 is a block diagram of the electronic circuit that receives and discriminates signals picked up by the double loop of FIGS. 1 and 2.

FIGS. 4 to 6 are timing diagrams showing the signal levels that correspond to the various badge configurations shown diagrammatically in FIG. 2.

DETAILED DESCRIPTION

FIG. 1 shows the wave pickup system of the present invention which is constituted by two distinct wave pickups 10 such as loops (single turns) or coils that are responsive to a magnetic field which forms in the vicinity thereof.

The wave pickups also serve for possible transmission of signals to the badges, however that aspect is not described since it does not apply to the invention. The invention may also be implemented with terminals that perform a read function only, e.g. in access control systems where it suffices to recognize and authenticate a user by means of the signal produced by the badge moved close to the terminal by the user.

The two loops 10 are of similar size, they are plane, and they are disposed adjacent to each other, being spaced apart by a predetermined gap d (FIG. 2).

The assembly constituted by the two loops may be enclosed in a non-magnetic case 12, e.g. fixed on a post or a stand, on the central upright of a bus entry door, etc., so that the plane of the coils 10 is substantially vertical and defines two possible passages on either side of a midplane 14 (FIG. 2), these two possible passages being represented by arrows 16 and 18 to the right or left of the case 12 of the terminal.

When a plurality of badges 20 are to be found simultaneously within range of the double loop, the purpose of the invention consists in determining whether the first badge with which communication has been established is to the right or the left of the double loop of the terminal, and in thus making it possible to perform an action (switching on a light signal, opening a gate, etc.) applicable to the user with whom communication has been established and not to a user situated on the other side. Thus, if the terminal unlocks a gate, then if the user with whom communication has been established is on the right, it unlocks a righthand gate but not the lefthand gate, and vice versa for a user on the left.

FIG. 3 is a diagram of the detection and discrimination circuits of the terminal.

Each of the two loops 10 constitutes an inductor element that is associated with a capacitor element 22 that is fed with AC coming from a source 24 via a resistor 26. The corresponding respective signals are shaped by circuits 28 and they are applied to a differential circuit having two phase-voltage converters 30.

With such a circuit, and in conventional manner, when a badge comes within range of the terminal, inductive coupling is established between the terminal and the badge which contains a resonant circuit, thereby modifying the impedance of the badge between two states: resonant or not resonant. Seen from the terminal, this modulation gives rise to a change in phase shift between the signals applied to the inputs of the converters 30, which change in phase shift increases with approach of the badge to the loop, and is transformed after demodulation into a signal of varying amplitude at the outputs from the converters 30.

In the communications protocol used, it is the terminal that governs dialog with the badge. Thus, initially, it is necessary for the terminal to select the badge with which it is going to interchange data. Known protocols, e.g. those described in above-mentioned EP-A-0 565 469, serve to avoid any conflict or collision and to communicate in succession with different badges even if they are present simultaneously within range of the terminal, and at any given instant the terminal dialogs with only one of the badges.

The reader then proceeds to recognize and authenticate the badge, and if the badge is accepted, it may optionally decrement a count unit in the memory of the badge and perform some appropriate action, e.g. unlocking an access gate or switching on a light signal informing the user that he is authorized to pass through.

However, in the particular situation where the user may be on the left or on the right of the loop, it is necessary to know which of two gates or which of two lights, to the right or to the left, that needs to be operated.

To enable such discrimination to be performed, the signals from the two converters 30 are applied firstly to a summing circuit 32 that provides a sum signal, and secondly to a subtracter circuit 34 that provides a difference signal. After shaping by a circuit 36, the sum signal provides a signal 38 representative of data transmitted by the badge to the terminal, which data is used in conventional manner for checking, authentication, etc.

The discrimination signal is produced by a comparator circuit 40 having inputs that receive the sum signal and the difference signal from the circuits 32 and 34 respectively, and producing a discrimination signal 42 (giving a binary indication "right" or "left") in application of principles that are described in greater detail below with reference to FIGS. 2 and 4 to 6.

The right and left loops are referred to as A1 and A2 and it is assumed that there is only one badge present, which is located at B2, i.e. beside loop A2. The signals produced at the outputs from the converters 30 for each of the loops are shown in FIG. 4, it being understood that the high level produced by a badge corresponds to a resonant state thereof and that a low level to a non-resonant state (the badge being resonant continuously except during periods of transmission). As can be seen, the signal amplitude obtained from loop A2 (i.e. the loop situated on the same side as the badge), is greater than the amplitude of the signal from the loop A1 which is situated further away form the badge (the two antennas being spaced apart by the gap d).

We now consider the case where two badges are present simultaneously at B1 and at B2, i.e. at approximately equal distances from the two loops, but on opposite sides thereof. It is assumed that communication was initially established with the badge situated at B1 so that the badge at B2, although present, is not transmitting and is therefore in a state of continuous resonance. The signals picked up by A1 and A2 then appear as shown in FIG. 5, in which it can be seen that the maximum amplitude received from the loop A1 on the same side as the badge in communication is likewise greater than the maximum amplitude received from the side of loop A2, in spite of the badge B2 being present, with the presence of that badge appearing merely as a DC offset in signal level relative to a baseline (marked in dashes in the figures and corresponding to complete absence of any badge in range of the terminal).

The case shown in FIG. 6 is similar to that shown in FIG. 5, except that the badges are now situated at B2 and at B'1, where B'1 is the badge in communication with the terminal and B2, although present in the field of the terminal, is not interchanging data therewith. However, B'1 is situated further away from the terminal than the badge at B1 of the preceding case. In this situation, a difference in maximum levels can still be seen between the signals received by the two loops, so it is still possible to determine which loop is closer to the badge with which communication has been established, i.e. the loop A1 in the present case. It should merely be observed that, as a function of the maximum range of the system, the gap d between the two loops is selected so that this difference in amplitude can always be observed, thereby ensuring that discrimination can be performed under all circumstances.

We claim:

1. A terminal for contactless communication with portable objects, said terminal comprising:

a wave pickup device responsive to a magnetic component of an electromagnetic field; and a receiver co-operating with said wave pickup device to receive and amplify signals picked up thereby;

wherein said wave pickup device further comprises:

at least two distinct wave pickup elements of substantially similar dimensions which are plane and disposed adjacent to each other and which are separated from each other by a predetermined gap, said wave pickup elements being substantially vertical and defining two passages on either side of a midplane; and a discriminator for discriminating the side of a midplane on which a signal-emitting portable object is situated, said discriminator deriving a discrimination signal from signals picked up by each of said wave pickup elements during a given period, wherein the discrimination signal indicates which one of said wave pickup elements has received the signal of greater amplitude.

2. The communications terminal of claim 1, wherein said terminal further comprises a transmitter, said transmitter co-operating with said wave pickup elements, wherein said wave pickup elements serve both for transmission and for reception of electromagnetic signals.

3. The communications terminal of claim 1, wherein said discriminator comprises:

a summer for producing a signal representative of the sum of the amplitude of said respective signals picked up by each of the wave pickup elements during a given period; and a subtracter for producing a signal representative of the difference between the amplitudes of the same signals as respectively picked up during a given period, wherein said discriminator derives a discrimination signal indicating which one of said wave pickup elements has received the signal presenting the greater amplitude on the basis of the signals produced by the summer and the subtracter.

4. The communications terminal of claim 1, wherein said at least two wave pickup elements are substantially vertical and are located between two passages on either side of a midplane.

* * * * *